Oct. 6, 1970 W. L. FULTON 3,531,999

DETENT MECHANISM FOR A CONTINUOUSLY VARIABLE TUNED ELEMENT

Filed Nov. 12, 1968 5 Sheets-Sheet 1

INVENTOR.
WILLIAM FULTON

BY J. Patrick Cagney

ATTORNEYS

Oct. 6, 1970 W. L. FULTON 3,531,999

DETENT MECHANISM FOR A CONTINUOUSLY VARIABLE TUNED ELEMENT

Filed Nov. 12, 1968 5 Sheets-Sheet 2

INVENTOR.
WILLIAM FULTON

BY J. Patrick Cagney

ATTORNEYS

DETENT MECHANISM FOR A CONTINUOUSLY VARIABLE TUNED ELEMENT

Filed Nov. 12, 1968

INVENTOR.
WILLIAM FULTON
BY J. Patrick Cagney
ATTORNEYS

INVENTOR.
WILLIAM FULTON
BY J. Patrick Cagney
ATTORNEYS

United States Patent Office
3,531,999
Patented Oct. 6, 1970

3,531,999
DETENT MECHANISM FOR A CONTINUOUSLY VARIABLE TUNED ELEMENT
William L. Fulton, Roselle, Ill., assignor to Standard Kollsman Industries Inc., Melrose Park, Ill., a corporation of Illinois
Filed Nov. 12, 1968, Ser. No. 774,885
Int. Cl. F16h 35/18
U.S. Cl. 74—10.6 15 Claims

ABSTRACT OF THE DISCLOSURE

A detent mechanism for a continuously variable tuned element is provided with an input drive shaft rotatable about 360° and having a plurality of fixed detented positions. Each of the detented positions is presettable to provide selection over the entire range of the variable tuned element, which in the embodiment shown, is the input shaft of a UHF tuner.

BACKGROUND OF THE INVENTION

This invention relates to tuners and is more particularly concerned with the provision of a detented drive mechanism for a continuously variable tuned element, such as the ganged capacitors of a UHF television tuner.

Detented tuning devices for the selection of particular frequencies within a broad frequency band are commonly used in radio and television sets. A typical example is the VHF tuner of a television receiver where tuning to the successive channels (2, 3, –. –. –. –. 13) are obtained at the successive detented positions. Present commercial television receivers also include a UHF tuner, typically of the continuously variable tuning type. A detented preset arrangement is particularly desirable in such UHF tuners, since the UHF tuner covers a wide range of frequencies including 70 channels and most localities usually have a relatively small number of available channels scattered within this range. Greater convenience to the user is achieved by eliminating the need to search for widely scattered channels. Furthermore, the life of the tuner may be substantially lengthened by eliminating mechanical wear resulting from such hunting for a desired channel.

The application of detent mechanism to the continuously variable tuned input of the UHF tuner, has in the past been associated with various drawbacks.

In one previous type of fine tuning device having the preset characteristic above referred to, a series of screw members are provided on a common carrying head. These screw members drive a common rocker arm. While the individual screw members may be longitudinally adjusted over the complete range of adjustment for the rocker arm, this device requires that each screw member be driven individually and retained within a threaded portion of the common carrying head. Devices of this type are of the pushbutton type rather than the rotatable detent input. Such pushbuttons require a greater amount of space on the face of the television than does a rotatable knob.

Another previous type of tuning device includes a detent mechanism having twenty-four positions. These positions may be preset such that each position can be adjusted over a particular three-channel range. The positions are successively adjustable over the UHF range from channels 14–83 such that the first position may be adjusted to any of channels 14 through 16, the second position may be adjusted to any of channels 17–19, and so on. This type of tuner is of limited utility since in many localities there are only a few widely scattered UHF channels. As a result, a user of this type of tuner would have to go through a great number of intermediate unused detent positions before obtaining the desired operating channels. For instance, in New York City there are presently three UHF channels in use—channels 25, 31 and 47. A person wishing to go from channel 31 to channel 47 would have to go through five unused detented positions causing wear on the mechanical structure and inconvenience. In many localities the separation between channels is even greater.

Another type of tuner existing in the prior art has six positions, each adjustable to any channel receivable over the entire range. This tuner, however, has a very complex intermediate drive system which requires the user of the tuner to rotate the channel selector 180° to translate the drive only 60°. This requires the user of the device to turn the tuning knob more than 360° to cover the entire range of possible tunable channels. The additional turning not only leads to inconvenience but makes it more difficult for the user to determine which of the six positions the selector is fixed upon. The additional turning also results in a considerable amount of wear on the moving parts.

The tuner of the instant invention corrects each of the shortcomings of the above described prior detent tuners by providing a detent tuner having an input drive shaft rotatable about 360° through a predetermined plurality of fixed positions with each of these positions presettable to any channel over the entire UHF range.

In one embodiment of the instant invention the manual tuning knob is connected to a detent drive shaft having six longitudinally spaced cam members. The cam members have their active cam portions spaced in 60° incremental positions about the detent drive shaft such that as the input knob is rotated, each of these members is successively engaged to actuate its respective tuning structure. The particular tuning structure associated with each of the cam members is adjustable over the entire UHF range. While the individual tuning structures are each adjustable over the entire UHF range by a common fine tuning shaft, only the tuning structure actuated by its associated cam member is adjustable at a particular time.

It is one object of the instant invention to provide a detent mechanism for continuously variable tuned elements wherein a selection knob may be rotated to any one of a number of fixed positions.

It is a further object of the instant invention to provide a fine tuning device with a preset arrangement such that each position of the preset arrangement may be adjusted over the entire range of UHF channels.

It is another object of the instant invention to provide a tuner wherein all of the tuning structures associated with particular detent positions are tunable by a common adjustment member.

A further object of the instant invention is to provide a turning device having a fixed plurality of detented positions covering the entire tuning range and wherein the fixed positions are all located within a 360° rotation of the selection knob.

Another object of the instant invention is to provide a detent tuner with a rotatable selection knob having fixed positions and having means for visibly indicating the particular fixed position to which the knob is rotated and means for indicating the channel to which this position corresponds.

The above object features of the instant invention along with other object features will become apparent upon the reading of the following detailed description of the instant invention in conjunction with the drawings as follows.

FIG. 3 is a side elevational view of the tuning assembly of the instant invention partially in section to show the cam members situated behind the tuning arms in FIG. 2;

Figure 1:
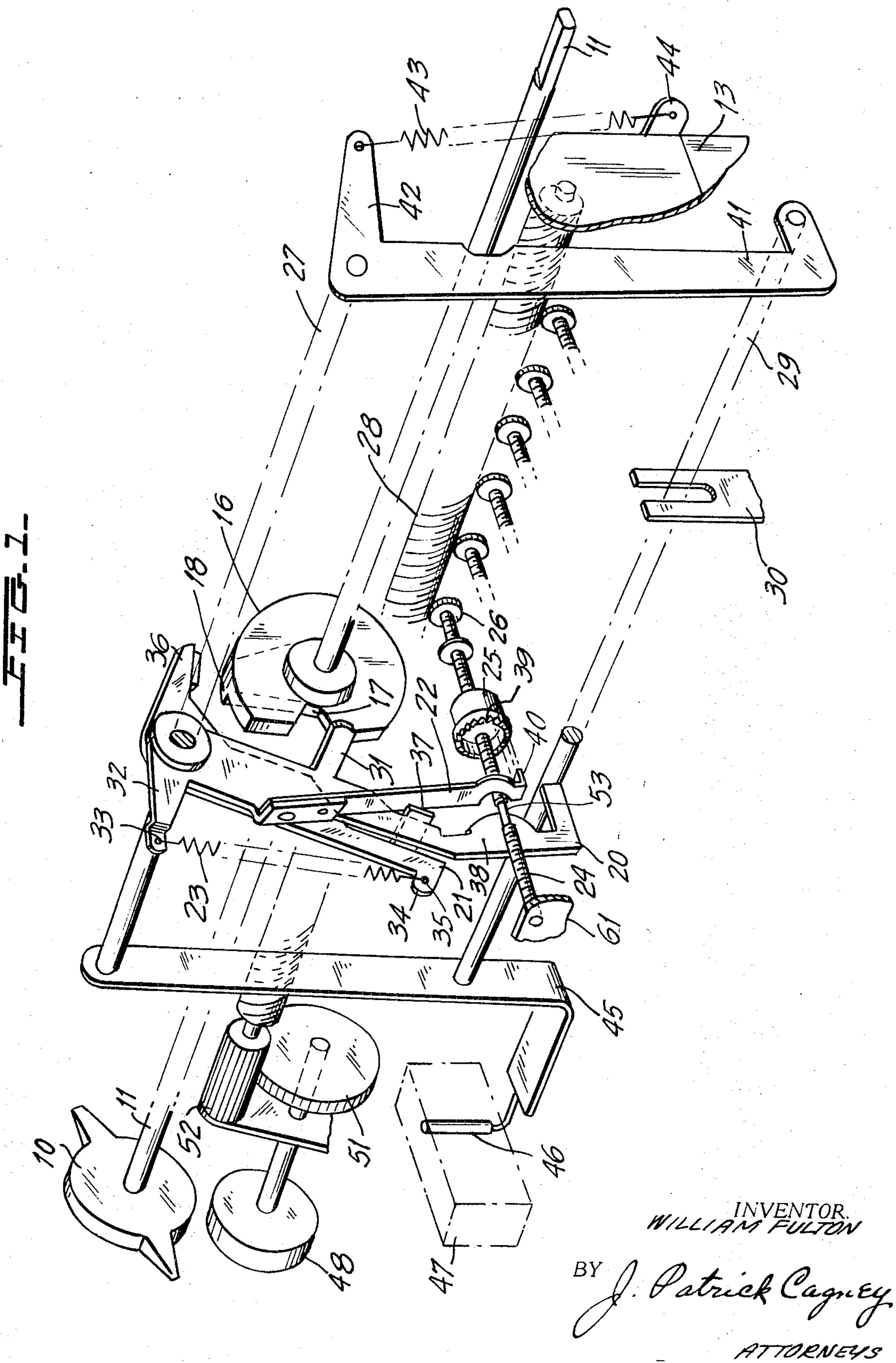
FIG. 1 is an exploded perspective view of the tuning assembly of the instant invention with only one tuning arm and one cam member shown therein.
Figure 2:
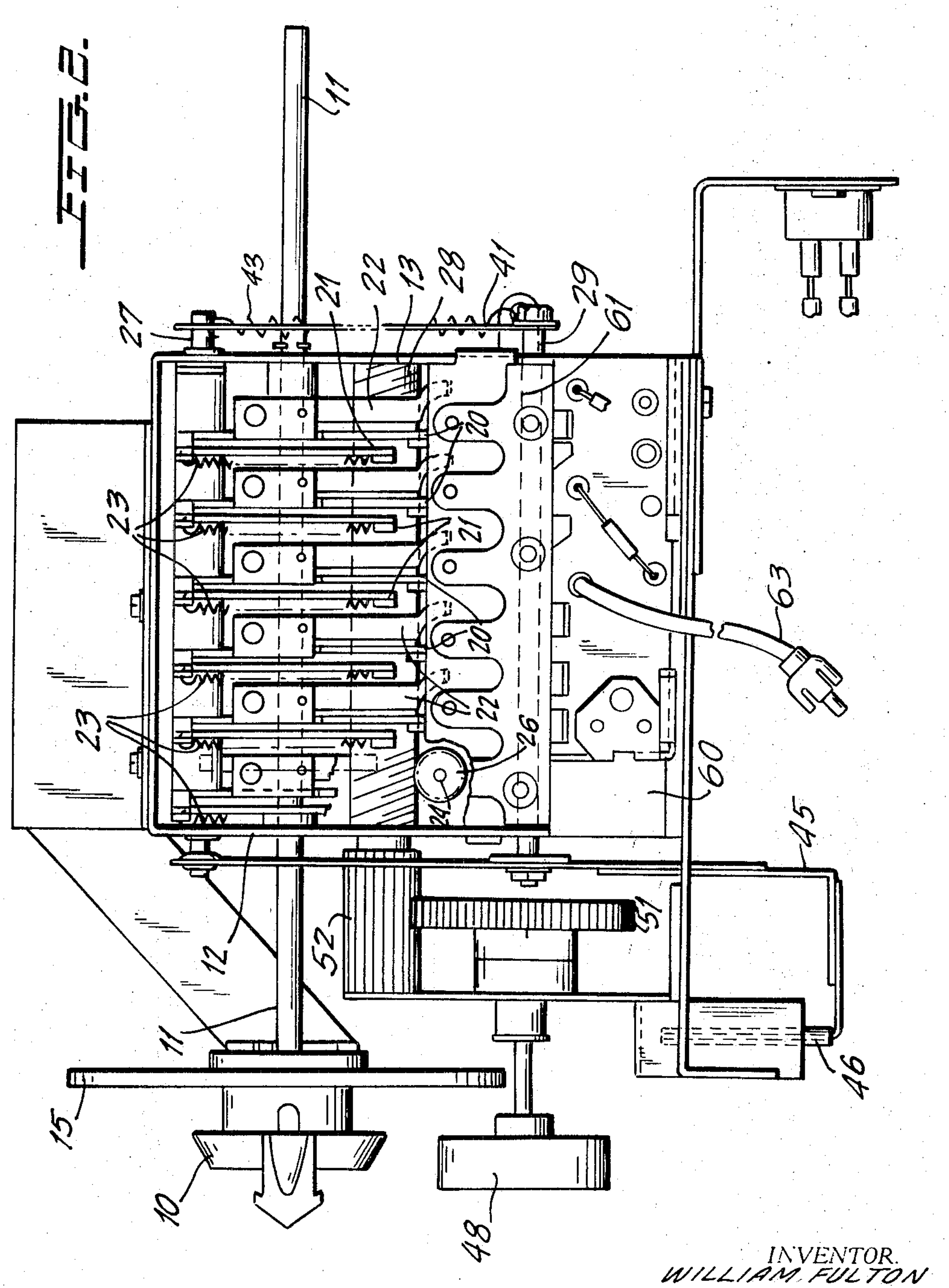
FIG. 2 is a side elevational view of the tuning assembly of the instant invention with a portion of the extreme left tuning arm and casing broken away.

Referring to the drawings, FIGS. 1–6 show the tuning assembly of the instant invention in conjunction with a six-position UHF tuner. Although six detent positions are illustratively shown, it is to be understood that the tuning assembly may be modified using the basic principles of the instant invention to provide more or less than six detent positions.

Figures 5, 6:
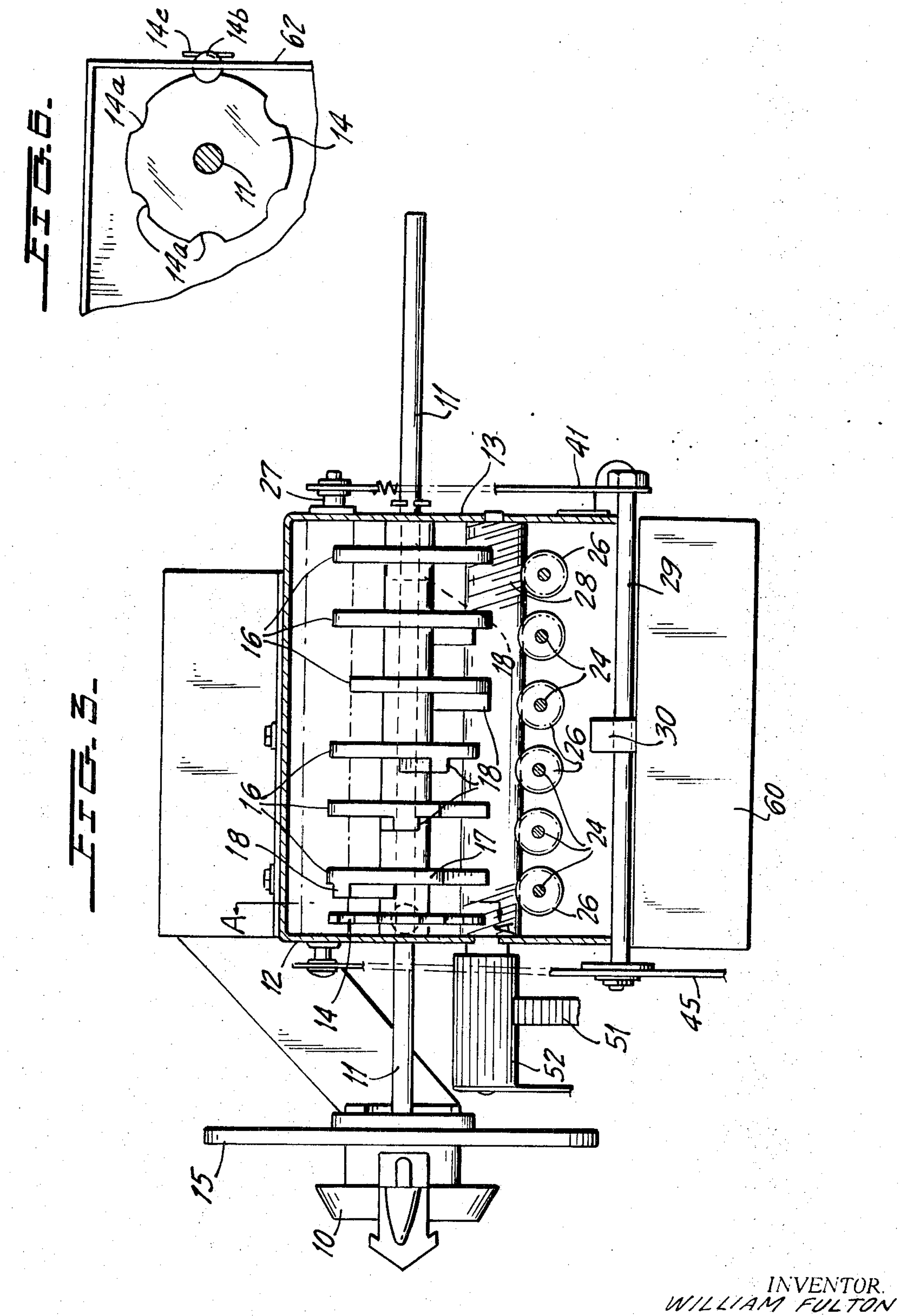
FIG. 5 is a rear elevational view of the tuning assembly of the instant invention.
FIG. 6 is a partial cross-sectional view taken along line A—A of FIG. 3 showing the detent disc.
Figure 5:
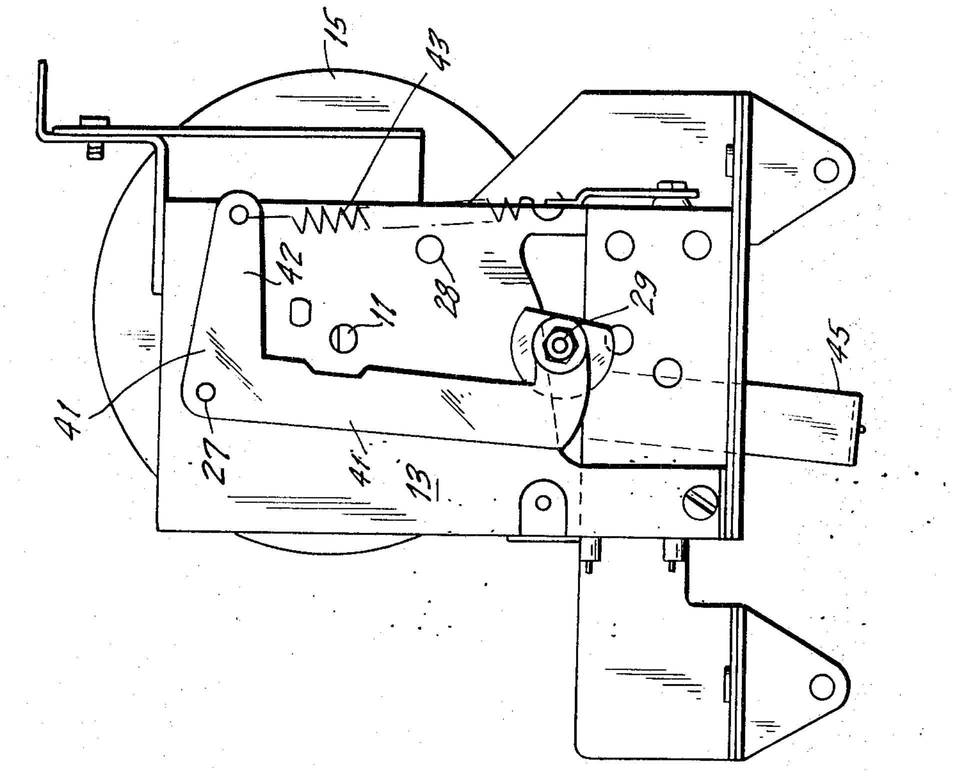
Figure 4:
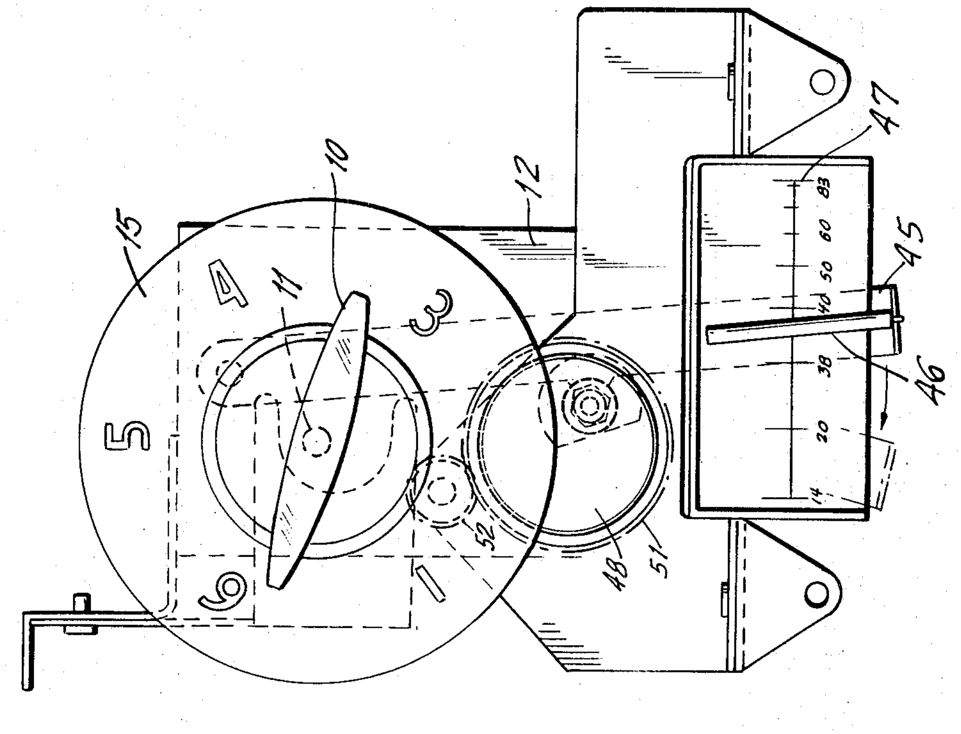
FIG. 4 is a front elevational view of the tuning assembly of the instant invention.

The tuning assembly includes a tuner knob 10, connected to an input drive shaft or detent shaft 11. The detent shaft 11 extends through the tuning assembly and is journaled through front wall 12 and rear wall 13 of the assembly housing. The shaft 11 has a detent disc 14 mounted thereon as shown in FIGS. 3 and 6, and has a position indicator 15 as shown most clearly in FIGS. 3 and 4.

The input knob 10 may be rotated to any one of six detent positions (see FIG. 6) thereby rotating the detent shaft 11 through successive 60° segments of the 360°. The six positions of the input knob 10 are determined by the six semi-circular notches **14*a* in the detent disc 14. These notches 14*a* are equally spaced along the circumference of disc 14. The detent mechanism further includes a steel ball 14*b* extending through a hole in wall 62 of the housing and biased towards the detent disc by leaf spring 14*c***.

As the detent shaft 11 is rotated, the ball **14*b* successively engages the semi-circular notches 14*a* from each 60° of rotation. Since the ball 14*b* is spring biased against the detent disc 14 by the spring 14*c***, the detent shaft will have six well defined stable positions.

The detent shaft 1 has six selection cams 16 longitudinally spaced therealong (see FIG. 3). The selection cams 16 are all identical but are mounted upon the detent shaft 11 with their active cam portions 17 and 18 incrementally displaced by 60° from one section cam 16 to the next so that as the detent shaft 11 is rotated, the selection cams 16 successively activate their respective tuning structures.

The tuning srtucture associated with each selection cam 16 consists of a tuning arm 20, a spring pressure arm 21, a leaf spring 22 and a biasing spring 23. The tuning structure associated with each selection cam 16 further includes an individual tuning shaft 24, a castellated tuning nut 25 and a gear head 26. The tuning arms 20 and spring pressure arms 21 are pivotally mounted to a common pivot bar 27.

The tuning assembly additionally includes common tuning structure in the tuning shaft worm gear 28 and tuning bar 29. Tuning bar 29 fits within the bifurcated open ended region of a member 30 (see FIGS. 3 and 7), which is connected to the tunable device. In the particular illustrative embodiment shown, bifurcated member 30 is connected to the common shaft of the ganged capacitors within the UHF tuner, which is generally indicated as 60. UHF tuner 60 may be of any well known commercial variety, as for example the type which is the subject of copending U.S. patent application Ser. No. 641,654 filed May 26, 1967, in the name of John L. Franke and Robert H. Redfield, entitled "UHF Television Tuner," and assigned to the assignee of the instant invention. As shown in that patent application, rotational movement of the gang capacitor shaft (as will be provided by similar rotational movement of bifurcated element 30) provides tuning of a preselected one of the UHF television broadcast channels 14–83 (470 mc.–890 mc.), to the television receiver IF frequency. The IF output is provided at shielded conductor 63, which is presented to the IF amplifier of the television receiver (not shown) in the conventional manner. Alternatively, the translation of tuning bar 29 may serve to preselectively tune other adjustable elements, as for example the potentiometer device utilized for providing the controlled signals within a solid state television tuner of the general type shown in copending U.S. patent application Ser. No. 671,011 filed September 27, 1967 in the name of Thomas F. Gossard and Mutsuo Nakanishi entitled "Solid State Television Tuner" and also assigned to the assignee of the instant invention. It should be understood that the above applications of the instant invention are merely exemplary and the output movement of tuning bar 29 may be appropriately interconnected to the tuning control means of various other types of electrical devices.

The tuning arm 20 includes a projection 31 extending at right angles to tuning arm 20 and substantially parallel to the longitudinal axis of detent shaft 11. The tuning arm 20 is positioned in alignment with selection cam 16 so that projection 31 rides along the circumference of selection cam 16. At each detent position, a successive one of the selection cams 16 is rotated into position whereby its recessed region 17 is in the line of movement of the projection 31. In this position, the particular tuning arm 20 is free to move the tuning bar 29 and cause the tuning of the UHF tuner 60 to a preselected channel, as to be explained hereinafter.

Figure 7:
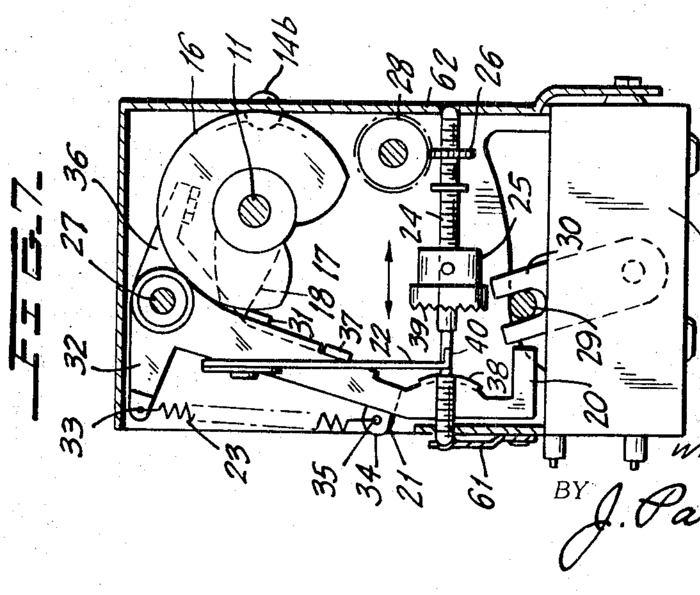

The tuning arm additionally is formed to have an upright projection 32 with a hole therein 33 for attachment to one end of the bias spring 23. The opposite end of the bias spring is connected to an upright projection 34 in spring pressure arm 21 at hole 35. The spring pressure arm 21 is mounted to the pivot bar 27 adjacent to its associated tuning arm 20. The smaller leg of the L portion of 36 of spring pressure arm 21 is normally biased in the path of cam portion 18 of selection cam 16 when the projection 31 rides upon the circumference of selection cam 16. This relationship can best be seen in FIG. 7. Also, as can be seen in FIGS. 1 and 7, the spring pressure arm 21 includes an additional projection 37 which limits the movement of the spring pressure arm 21 with respect to the tuning arm 20.

The castellated tuning nut 25 is threadably mounted to the individual tuning shaft 24 and is movable longitudinally therealong. The nut 25 is positioned in alignment with the path of movement of portion 38 of tuning arm 20. The portion 38 may include a flange edge so that when it is moved into engagement with the castellated nut 25, its movement will be consistently and accurately determined regardless of whether it is in line with a groove or grooves 39 on the castellated nut.

Attached to the tuning arm 20 is the leaf spring 22. This spring includes a projection 40 which is aligned with the castellated nut 25 so that the projection 40 engages with one of the grooves 39 in the castellated nut when the tuning arm is activated by its associated selection cam 16.

Before describing the operation of the tuning structure associated with a particular selection cam 16, the remaining common element of the tuning assembly of the instant invention will first be briefly described. As has been mentioned previously, the tuning assembly includes the tuning bar 29 in the path of movement of the tuning arm 20 associated with the individual tuning structures. Connected to one end of the tuning bar 29 is a common spring pressure arm 41. This common spring pressure arm 41 has an L-shaped portion which is mounted to the pivot bar 27 in the vicinity where the legs of the L meet. Connected to the smaller leg 42 of the bar 41 is a biasing spring 43. This biasing spring is also connected to a projection 44 on the wall 13 of the housing. As can be seen in FIG. 1, the spring biases the tuning bar 29 in a direction opposite to the direction in which it is moved by the tuning arm 20 associated with the individual tuning structures. Thereby the tuning bar 29 will always be returned to a position in engagement with one of the tuning arms 20.

At its opposite end the tuning bar 29 is connected to an L-shaped bracket 45. This bracket is additionally connected to the pivot bar 27. Connected to the bracket 45 is a channel indicating needle 46. This needle 46 is spaced adjacent a panel 47 which has the range of frequencies of the particular tuner enumerated thereon and calibrated in correspondence to the movement of the tuning bar 29.

As can be seen in FIG. 1, the tuning bar 29 is pivotally mounted by means of arm 41 and bracket 45 to the same pivot bar 27 as the individual tuning structures associated with each selection cam 16. This common pivoting increases the accuracy of the tuning and particularly the repeatability of the tuning positions of the individual tuning structures. It is to be noted that the pivot bar 27 and the detent shaft 11 both include spacers situated between the elements mounted thereon to prevent longitudinal movement of these elements along the tuning bar 27 or detent shaft 11, respectively.

Another common element of the tuning assembly of the instant invention is the fine tuning shaft or tuning shaft worm gear 28 as mentioned previously. This worm gear is journaled in the rear wall 13 of the tuning assembly and in the front wall 12. The tuning shaft worm gear 28 is positioned in engagement with each of the gear heads 26 associated with the individual tuning shaft 24. As will be explained hereinafter, such rotation causes the adjustment of the tuning position of a single tuning structure.

Having described the essential elements of the tuning assembly of the instant invention, a description will now be given of the operation of this assembly. Since each of individual tuning structures operate identically, the operation of only one will be described herein.

Referring first to FIG. 7, there is shown the tuning structure associated with an individual selection cam 16. The cam and tuning structure are in their inactive position as can be seen from the fact that the recessed portion 17 of the selection cam 16 is not in alignment with the projection 31 of the tuning arm 20. Also, as can be seen from FIG. 7, in this inactive position, the tuning arm 20 is sufficiently far removed from the tuning bar 29 as a result of the projection 31 riding upon the circumference of the selection cam 16 so that the tuning arm 20 does not engage the tuning bar 29.

Figure 9:
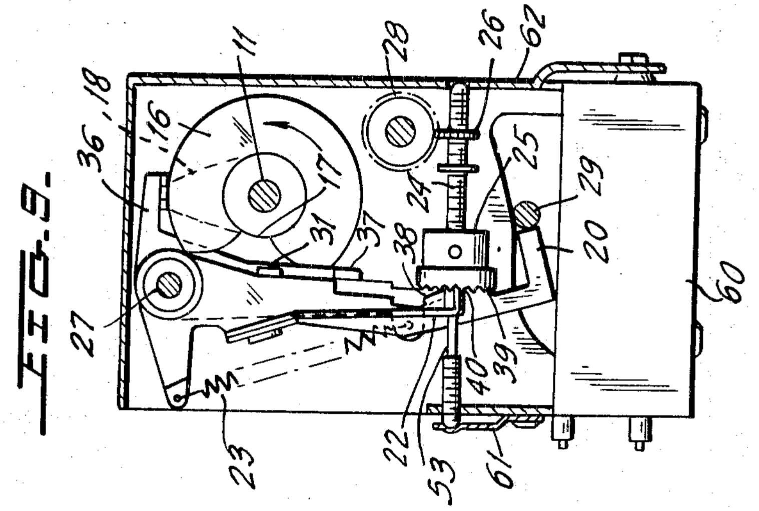
FIGS. 7–9 are cross-sectional rear views showing the sequence of operation of the tuning structure associated with one detent cam.
Figure 8:
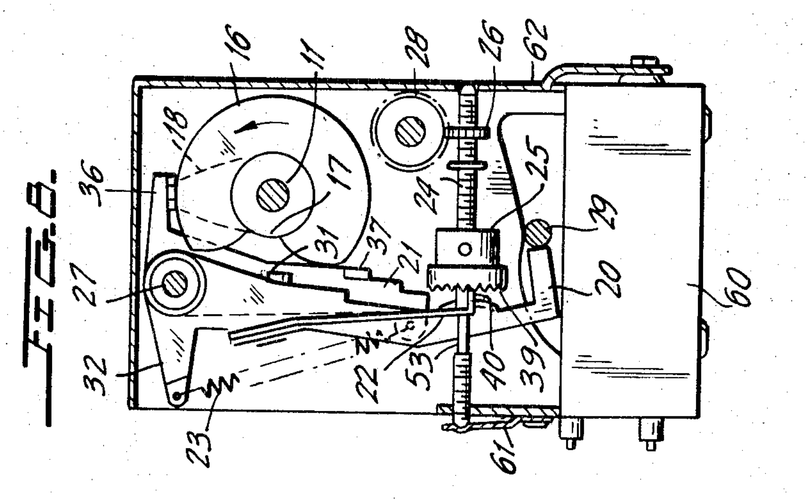

Assuming that the detent shaft 11 is rotated as a result of the rotation of the knob 10 so that the selection cam 16 of FIG. 7 is rotated to the position shown in FIG. 8, the cam portion 18 will be brought into engagement with the projecting arm 36 of the spring pressure arm 21. This will cause counterclockwise rotation of the spring pressure arm 21 (viewing the structure as shown in FIGS. 7 through 9) about the pivot arm 27. The rotation of the spring pressure arm 21 causes the biasing of springs 23 to the position shown in FIG. 8. In this condition, the spring 23 creates a moment upon the tuning arm 20 as a result of its connection to the projection 32 on the tuning arm. The tuning arm 20 will thereupon follow the movement of the spring pressure arm 21 to the position shown in FIG. 9. It should be clear that the tuning arm 20 will be free to rotate in this direction since the projection 31 will no longer be blocked by the circumference of the detent cam 16, the latter having been rotated to the position whereby the recessed portion 17 is in alignment with the projection 31.

As can be seen, although the tuning arm has been freed to move by the selection cam 16, it does not move the entire distance permitted by this selection cam as a result of the engagement of the tuning arm portion 38 with the tuning nut 25. In so limiting the distances which the tuning arm 20 may move, the tuning nut 25 determines the distance which the tuning bar 21 may be displaced and thereby determines the channel to which the tuning bar is to tune a continuously variable tuned element within the tuner (it is noted that the member 30 has not been shown in FIGS. 8 and 9 in order to more clearly show the mechanical relationship between the tuning arm 20 and the tuning bar 29).

Having described the operation of an individual tuning structure associated with a particular selection cam 16 with regard to the rotation of the detent shaft 11 to cause the activation of such tuning structure, there remains to be described the operation of the tuning assembly whereby the individual tuning structures may be predeterminedly adjusted to fixed positions so as to enable the selection of predetermined channels by mere rotation of the input knob 10 to a particular detent position. Referring again to FIG. 9, it can be seen that when a particular tuning structure is activated as a result of the rotation of the selection cam 16 to permit the tuning arm 20 to move into engagement with the tuning bar 29, concurrently the leaf spring 22 will move into engagement with the tuning nut 25 so that the projection 40 of the leaf spring 22 engages one of the grooves 39 of the tuning nut 25. In so doing, the leaf spring prevents the rotational movement of the nut 25.

In order to adjust the positioning of the nut 25, the tuning shaft worm gear 28 is next rotated. This rotation causes the rotation of the individual tuning shafts 24 as a result of the engagement of the gear heads 26 with the tuning shaft worm gear 28. Rotation of the individual tuning shafts will have no effect upon the longitudinal location therealong of the tuning nuts 25 associated with tuning structures not activated since the tuning nuts 25 will rotate with the tuning shafts 24 of such tuning structures and there will be no relative movement therebetween and no longitudinal displacement. With regard to the tuning structure which is activated, however, only the individual tuning shaft 24 will rotate since the particular tuning nut 25 will be held against rotational movement by the leaf spring 22. Rotation of this individual tuning shaft 24 will thereby cause the longitudinal displacement of the associated tuning nut 25 by means of the screw action between the tuning nut and the tuning shaft. In this manner, it is noted that a common tuning shaft worm gear 28 is used to simultaneously rotate all of the tuning shaft 24. However, only the rotation of the particular activated tuning structure will cause a change in the channel to which a particular detent position is adjusted.

In the above described operation, it should be observed that the tuning nuts 25 may be longitudinally displaced along the entire usable portion of the individual tuning shaft 24. For added convenienece, the tuning shafts 24 may include an unthreaded portion 53 preventing the longitudinal displacement of the tuning nut 25 along the individual tuning shaft 24 beyond a particular point. The longitudinal displacement of the tuning nut 25 along the tuning shaft 24 in the opposite direction is limited by the fact that continuous movement of the tuning nut 25 along the shaft 24 to the right (as shown in FIG. 9) will cause the engagement of the projection 31 on the tuning arm 20 with the recessed section 17 of the selection cam 16 and upon continued rotation of the tuning shaft worm gear 28, the leaf spring 22 will become disengaged from the tuning nut 25, thereby enabling the tuning nut 25 to rotate with the tuning shaft 24.

From the above description it should be apparent that each of the particular detent positions may be adjusted over the entire range of channels receivable by the particular tuner by the adjustment of the location of the particular tuning nut 25 along the tuning shaft 24 associated with the particular detent position. It should also be apparent that each of the particular detent positions may be adjusted to select any of the receivable channels without affecting the adjustment of any of the other detent positions.

The above described assembly has the additional feature in that the indicating means for indicating the particular channel selected is connected to the tuning bar and thereby it directly indicates the channel selected even though the detent positions may not be adjusted in a particular linear sequence of channels.

As shown above, the tuner assembly of the instant invention provides a detent mechanism for a continuously tuned element whereby an input selection knob may be conveniently rotated through 360° to any of a plurality of fixed detent positions. Each of these detent positions being presettable over the entire range of channels to which the tuner is tunable.

While a preferred embodiment of the instant invention has been described herein, many modifications and variations will now become apparent to those skilled in the art. It is, therefore, preferred that the scope of the invention not be limited by the disclosure herein but rather by the appended claims.

The embodiments of the invention in which an exclusive privilege or property is claimed are defined as follows:

1. A tuning assembly comprising a continuously variable tuning control element, a detent drive shaft rotatable about its axis through a predetermined number of detent positions; a corresponding number of selection cams longitudinally spaced along said detent drive shaft and rotatable thereby; with each of said selection cams being associated with a predetermined detent position and being rotatably positioned by said detent drive shaft upon rotation thereof to its associated detent position; and separate tuning means individually engageable with a corresponding one of said selection cams and responsive when such corresponding cam is at its corresponding detent position to drive said continuously variable tuning control element to a separate preselected position.

2. The tuning assembly of claim 1 wherein said detent drive shaft is rotatable about its axis through 360° and wherein said predetermined number of detent positions are uniformly circularly spaced throughout said 360°; said selection cams having active cam portions uniformly circularly spaced corresponding to the circular spacing of said detent positions.

3. The tuning assembly of claim 2 wherein each of said tuning means is adjustable over the entire range of positions to which said continuously variable tuned element may be driven.

4. The tuning assembly of claim 3 wherein said tuning control element is a tuning bar engageable by each of said tuning means.

5. The tuning assembly of claim 4 wherein each of said adjustable tuning means includes a tuning arm responsive to the actuation of said associated selection cam to move into engagement with said tuning bar and move said tuning bar to a predetermined position.

6. The tuning assembly of claim 5 wherein each of said adjustable tuning means further includes an adjustable tuning nut situated in the path of movement of said corresponding tuning arm; said tuning nut limiting the extent of movement of said corresponding tuning arm and thereby determining the position to which said tuning arm will move said continuously variable tuning control element.

7. The tuning assembly of claim 6 wherein said tuning means further includes individual tuning shafts; said tuning nuts being mounted to said tuning shafts and longitudinally movable therealong; a common tuning shaft operatively connected to each of said individual tuning shafts and being rotatable to cause rotation of said individual tuning shafts; means connected to each of said tuning arms engageable with its associated tuning nut when said associated cam is actuated thereby causing rotational movement of said tuning nut with respect to said individual tuning shaft when said individual tuning shaft is rotated and thereby causing longitudinal movement of said tuning nut along said individual tuning shaft to alter the channel to which said tuning means is fixed.

8. A tuning assembly comprising a continuously variable tuning control element, a detent drive shaft rotatable about its axis through a predetermined number of detent positions; a corresponding number of individual tuning structures, with each of said tuning structures being associated with a respective detent position; and a corresponding number of selection cam means longitudinally spaced along said detent drive shaft and rotatable in unison therewith; each of said individual tuning structures being selectively engageable by a corresponding one of said cam means when said detent drive shaft is rotated to a selected corresponding detent position to drive said continuously variable tuning control element to a separate preselected position.

9. The tuning assembly of claim 8 wherein each of said individual tuning structures is adjustable and presettable to drive said continuously variable tuning control element to any position over the entire range of positions to which said continuously variable tuning control element may be driven.

10. A UHF tuning assembly having a rotatable input detent drive shaft with a predetermined number of fixed detent positions corresponding to preset channels within the UHF range of a tuner, said tuning assembly further comprising:

a corresponding number of cam members longitudinally spaced along said drive shaft, each of said cam members having an active cam portion, said active cam portions being successively arcuately displaced from each other along said drive shaft by 360° divided by said number of fixed positions;

individual tuning structures associated with each of said cam members, each of said tuning structures including:

a spring pressure arm engageable by said active cam portion of said associated cam member when said drive shaft is in its associated fixed position;

a tuning arm operatively connected to said spring pressure arm and movable between first and second positions, said tuning arm being in said first position when said spring pressure arm is not engaged by said active cam portion and said tuning arm being in said second position when said spring pressure arm is engaged;

an individual tuning shaft; and a tuning nut threadedly mounted on said tuning shaft for longitudinal movement therealong, said tuning nut being in engagement with said tuning arm when said tuning arm is in said second position whereby the position of said tuning nut determines said second position; and a common tuning bar engageable by each of said tuning arms of said individual tuning structures to tune a continuously variable tuned element to a channel corresponding to the second position of the corresponding tuning arm.

11. The tuning assembly of claim 10 further including means for individually adjusting the position of each of said tuning nuts whereby said second positions of each of said tuning arms may be adjusted to positions corresponding to channels over the entire UHF range of said tuner.

12. The tuning assembly of claim 11 further including means attached to said common tuner bar for indicating the channel to which said tuner is tuned.

13. In a multi-channel preset tuning arrangement that includes a selector shaft rotatable to a predetermined number of channel selection positions, a separate tuning control assembly corresponding to each position and each operable to control tuning when the selector shaft is at the corresponding channel selection position, and a common tuning shaft operable for controlling adjustment of each of the tuning control assemblies, the improvement in that each tuning control assembly includes means mounting a separate tuning screw in continuous engagement with the common tuning shaft during rotation thereof to cause simultaneous rotation of all of said tuning screws with the tuning shaft, each tuning control assembly includes a separate nut that determines the operative tuning setting for such assembly in accordance with the position of the nut along its tuning screw, each nut being threadably engaged upon the corresponding tuning screw either to shift axially therealong when the nut is held against rotation while its tuning screw rotates or to remain at a fixed axial position while rotating with its tuning shaft.

14. In a multi-channel preset tuning arrangement as defined in claim 13 and wherein each tuning control assembly includes means responsive only when the selector shaft is at the corresponding channel selection position for engaging the corresponding nut to hold the same against rotation with the corresponding tuning screw.

15. In a multi-channel preset tuning arrangement as defined in claim 13 and wherein the arrangement includes a continuously variable tuning control element, each of said tuning control assemblies including means responsive when the selector shaft is at the corresponding channel selection position to drive said tuning control element to a position determined by the corresponding nut.

References Cited

UNITED STATES PATENTS

| | | | |
|---|---|---|---|
| 2,872,824 | 2/1959 | Coutermash | 74—10.6 |
| 3,447,386 | 6/1969 | Berenbaum et al. | 74—10.6 X |
| 3,459,055 | 8/1969 | Sperber | 74—10.6 |

MILTON KAUFMAN, Primary Examiner

U.S. Cl. X.R.

74—10.85